US006371232B1

(12) United States Patent
Drake et al.

(10) Patent No.: US 6,371,232 B1
(45) Date of Patent: Apr. 16, 2002

(54) TRACTOR CAB PROVIDING UNDER-CAB COMPONENT ACCESS

(75) Inventors: Randy B Drake, Franklin, VA (US); William C. Roberson, Murfreesboro; Bryant E. Ward, Ahoskie, both of NC (US)

(73) Assignee: Franklin Equipment Co., Inc., Franklin, VA (US)

( * ) Notice: Subject to any disclaimer, the term of this patent is extended or adjusted under 35 U.S.C. 154(b) by 0 days.

(21) Appl. No.: 09/557,784

(22) Filed: Apr. 26, 2000

Related U.S. Application Data

(60) Provisional application No. 60/132,111, filed on Apr. 30, 1999.

(51) Int. Cl.[7] .............................................. B62D 33/06

(52) U.S. Cl. ............................... 180/89.12; 180/89.17; 296/190.11

(58) Field of Search .......................... 180/89.12, 89.13, 180/89.14, 89.15, 89.16, 89.17, 89.18, 89.19; 296/190.11, 37.14

(56) References Cited

U.S. PATENT DOCUMENTS

| | | | |
|---|---|---|---|
| 2,838,126 A | 6/1958 | Gleasman | |
| 3,088,537 A | 5/1963 | Le Tourneau | |
| 3,582,132 A | 6/1971 | Gunning | |
| 3,831,699 A | 8/1974 | Wolter | |
| 3,981,375 A | 9/1976 | Crawford | |
| 4,120,375 A | * 10/1978 | Shinoda et al. | 180/89.14 |
| 4,221,274 A | * 9/1980 | Martin, Jr. | 180/89.14 |
| 4,312,418 A | * 1/1982 | Rittman | 180/89.17 |
| 4,785,900 A | 11/1988 | Nasky | |

FOREIGN PATENT DOCUMENTS

| | | |
|---|---|---|
| DE | 3545334 A1 | 7/1987 |
| EP | 0885836 A1 | 12/1998 |
| GB | 802178 | 10/1958 |

* cited by examiner

*Primary Examiner*—Eric Culbreth
(74) *Attorney, Agent, or Firm*—Morgan Lewis & Bockius

(57) ABSTRACT

The present invention discloses a novel work vehicle cab compartment, such as a tractor cab, that is configured to provide convenient and ample access to under-cab components. The cab compartment is fixedly mounted onto a work vehicle frame and includes a cab footing structure secured to the work vehicle frame and a pivoting floor structure. The pivoting floor structure includes a raised central portion and flange portions, which partially define the floor of the cab compartment. One of the flanged portions mechanically fastened to the cab footing structure while another flange portion is hingedly coupled to a mounting structure that is secured to the cab footing structure. A pivoting seat assembly, including an operators seat, is attached atop a seat suspension that is mounted to the pivoting floor structure. The pivoting floor structure, as well as the pivoting seat assembly, are pivotally moveable in an outwardly direction to expose, and provide access to, vehicle components disposed under the cab compartment while the cab compartment remains fixedly mounted to the work vehicle frame.

35 Claims, 2 Drawing Sheets

TRACTOR CAB PROVIDING UNDER-CAB COMPONENT ACCESS

RELATED APPLICATION DATA

The present application claims priority to the U.S. Provisional Application No. 60/132,111, entitled "Tractor Cab Providing Under-Cab Access" filed on Apr. 30, 1999, in the names of Randy B. Drake, William C. Roberson, and Bryant E. Ward.

The contents of the aforementioned provisional application is hereby expressly incorporated by reference herein in its entirety.

RESERVATION OF COPYRIGHT

The disclosure of this patent document contains material, which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

This invention generally relates to the field of work vehicles. More particularly, the present invention relates to a novel work vehicle cab compartment, configured to provide safe, convenient, and ample access to under-cab components.

DESCRIPTION OF BACKGROUND INFORMATION

Work vehicles, such as industrial tractors used in construction, excavation, mining, and forestry, typically include a frame supported by the wheels or tracks of the tractor. The frame carries various components of the tractor, such as the engine, transmission, and drive system components, and various working attachments, such as end-loaders, back-hoes, tree-felling heads, grappling devices, or winches are attached to the frame. An operator's cab is situated atop the frame for affording the operator an elevated field of view, and is therefore disposed above a number of the mechanical components mounted within the frame.

The conventional means for providing access to the under-the-cab mechanical components for maintenance, cleaning, or trouble-shooting, is to provide a cab assembly that is pivotally attached to the frame so as to be able to pivot with respect thereto. With the cab tilted with respect to the frame, below-the-cab components then become accessible for cleaning, maintenance, and the like. Tilting of the cab, however, presents a number of disadvantages which make this feature less than ideal for achieving its intended purpose of providing access to under-the-cab components.

In order to be able to tilt the cab with respect to the frame, it is often necessary to disconnect connections between cab components and frame-mounted components, such as electrical wires and hydraulic control lines. Disconnecting, and subsequently reconnecting the lines, is in itself an extra task which requires additional time and effort for the cab tilting procedure, but there is also the possibility that connectors can be damaged or improperly reconnected or that reconnections can be forgotten altogether.

Certain tractors, such as forestry tractors, must be certified so as to withstand rollovers or objects falling onto the cab. Testing equipment mounted on the cab and frame necessary for such certifications must be disconnected so as to permit the cab to be tilted with respect to the frame, thereby creating potential difficulties in maintaining the required certification.

Industrial tractors typically encounter a great deal of wear and tear, which is inherent in the severe working environment in which such tractors are typically operated. This wear and tear can cause the cab tilt apparatus to malfunction, thereby preventing the cab from tilting away from the frame and/or preventing a tilted cab from again closing down onto the frame. This is especially a problem for the cab of a tractor that has been rolled, in which case it is very unlikely that the cab-tilt feature will thereafter operate properly.

Because of the size of the cab and the relatively high center of gravity relative to the frame, the cab cannot be tilted too far away from the frame. This limitation is due, in part, to the fact that tilting the cab too far may result in the instability of the tractor. Moreover, there may be space constraints, which limit the extent to which the cab can be extended away from the main frame, especially where maintenance and repairs are performed in an indoor maintenance facility. Consequently, the amount of access actually provided to the under-cab components by tilting the cab is relatively small.

As such, for any or all of the above reasons, many tractor owners simply do not or cannot use the cab-tilt feature of their tractor in order to gain access to under-cab components. Typically tractor owners are forced to gain access to such components by removing exterior side panels of the tractor body and/or from beneath the tractor, where possible. Therefore, what is needed is a work vehicle cab compartment, which is capable of providing safe, convenient, and ample access to under-cab components.

SUMMARY OF THE INVENTION

Work vehicles, designed in accordance with the principles of the present invention, address the need identified above by providing a novel work vehicle cab compartment that is configured to provide safe, convenient, and ample access to under-cab components.

In one aspect of the present invention, a work vehicle cab compartment configuration is presented, which is fixedly mounted onto a work vehicle frame. The cab compartment includes a cab footing structure secured to the work vehicle frame and a pivoting floor structure. The pivoting floor structure includes a raised central portion and flange portions, which partially define the floor of the cab compartment. One of the flanged portions mechanically fastened to the cab footing structure while another flange portion is hingedly coupled to a mounting structure that is secured to the cab footing structure. The pivoting floor structure is pivotally moveable in an outwardly direction to expose, and provide access to; vehicle components disposed under the cab compartment while the cab compartment remains fixedly mounted to the work vehicle frame.

In another aspect of the present invention, a pivoting seat assembly is provided, which includes an operators seat attached atop a seat suspension. The seat suspension is mounted to the pivoting floor structure. The pivoting seat assembly is configured to move in cooperation with the pivoting floor structure, when the pivoting floor structure is pivotally moved in an outwardly direction.

In a further aspect of the present invention, the pivoting floor structure and the pivoting seat assembly are actuated to pivotally move in an outwardly direction by releasing a mechanical fastener secured to one of the flange portions and pulling the pivoting seat assembly in a direction defined by a hinged coupling of one of the flange portions to the cab footing structure. Moreover, the pivoting seat assembly is configured to allow the flange portions of the pivoting floor structure to achieve at least a 90° angle relative to the cab footing structure, when the pivoting floor structure and the pivoting seat assembly are moved in an outwardly direction.

DETAILED DESCRIPTION OF THE PREFERRED EMBODIMENT

FIGS. 1–4 depict a work vehicle cab compartment (e.g., tractor cab), constructed and operative in accordance with aspects of the present invention. The cab, generally indicated by reference number 10, is mounted onto the frame 80 of a work vehicle 82, such as a tractor, for example, which is only partially shown in the figures.

Figure 1:
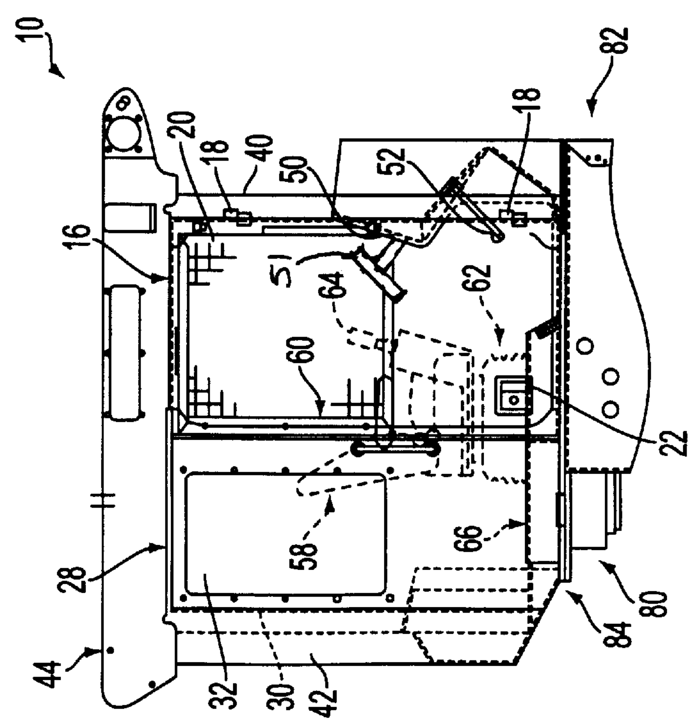
FIG. 1 is a side elevation showing a tractor cab constructed in accordance with the present invention.

The cab 10 preferably includes a pair of forward support posts 40 and a pair of rear support posts 42, all extending upwardly from a cab footing structure 84 fixed to the frame 80. A roof structure 44 extends across and is supported atop the forward support posts 40 and rear support posts 42. Left and right forward doors 12, 16 and left and right rear doors 24, 28 are operatively mounted on opposite sides of the cab 10. In particular, forward left door 12 is pivotally mounted by a hinge 14 to the left-side forward support post 40 and the forward right door 16 is pivotally mounted by hinge 18 to the right-side forward support post 40. Similarly, the rear left door 24 is pivotally mounted by a hinge 26 to the left-side rear support post 42, and the rear right door 28 is pivotally mounted by hinge 30 to the right-side rear support post 42. As shown in FIG. 1, the forward right door 16 includes a see-through panel 20 (e.g., a window or screen). The forward left door 12 also includes a similar see-through panel (not shown). To provide operator escape from the cab 10 should the cab roll over and/or the doors 16 and 12 malfunction, see-through panels 20 can preferably be kicked out of their respective doors. As also shown in FIG. 1, the right rear door 28 includes a see-through panel 32 (e.g., a window or screen), and the left rear door 24 includes a see-through panel 33 (see FIG. 2).

Figure 3:
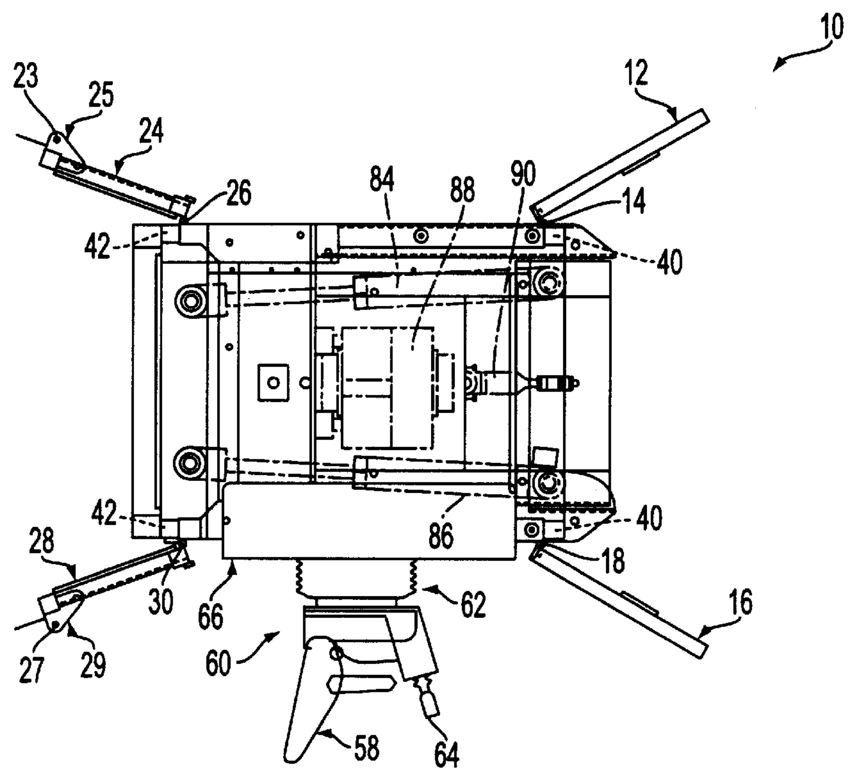
FIG. 3 is a top view of the cab showing the side doors open and the seat assembly pivoted sideways.

The rear doors 24 and 28 are preferably quasi-permanently locked, such as by bolting the doors in a closed position to the cab footing structure 84 and/or frame 80 and the roof structure 44, so that the doors 24 and 28 cannot normally be opened by operators or maintenance personnel. More particularly, (as shown in FIG. 3) locking brackets 29 are attached to the top and bottom edges of the right rear door 28, and locking brackets 25 are attached to the top and bottom edges of the left rear door 24. Holes 23 and 27 are formed through the locking flanges 25 and 29, respectively. The rear doors 24 and 28 are preferably held closed by means of bolts inserted through the holes 23, 27 of the respective top edge locking brackets 25, 29 and into the roof structure 44. In addition, bolts are inserted into through the holes 23, 27 of the respective bottom locking flanges 25, 29 and into the cab footing structure 84.

The forward doors 12 and 16 are held in a closed position against the bolted rear doors 24 and 28 by conventional latches 22 that are operable from inside or outside the cab 10, so as to provide the operator ready access into and out of the cab from either the left side or right side of the cab. The rear doors 24,28 are preferably quasi-permanently locked shut, such as by bolts as previously described because the forward doors 12, 16 latch against the rear doors. As such, it is necessary for the rear doors 24 and 28 to provide a solid structure against which the forward doors 12 and 16 can latch. The rear doors 24, 28 can be held closed by conventional latches operable from inside or outside the cab 10, but cab robustness may be compromised, so such an arrangement is typically not preferred.

A rear see-through panel 46 (e.g., a window or a screen) extends between the rear support posts 42 at upper portions thereof so as to provide the operator with rearward visibility. Similarly, a forward see-through panel (not shown) is provided between the forward support posts 40. The forward and rearward see-through panels may also be kickout panels for emergency escape if desired.

The cab 10 may also include a conventional forward instrument panel 50 and forwardly positioned operator pedals 52. The tractor 82 may also include a conventional steering wheel 51 (schematically represented in FIG. 1) for steering the tractor 82.

A pivoting seat assembly 60 is located inside the cab 10 and generally includes an operator's seat 58 mounted to a pivoting floor structure 66, which defines at least a portion of the floor of the cab and a cover for the under-cab components. The seat 58 can be of conventional design and may typically include a seat cushion, a seat back, arm rests, and seat belts. The seat 58 is attached atop a seat suspension 62, which in turn is secured to the pivoting floor structure 66, preferably on slidable seat-adjusting tracks (not shown). The seat may also include one or more control devices 64 (e.g., a joy-stick) for operating the tractor and/or tractor attachments.

Figure 4:
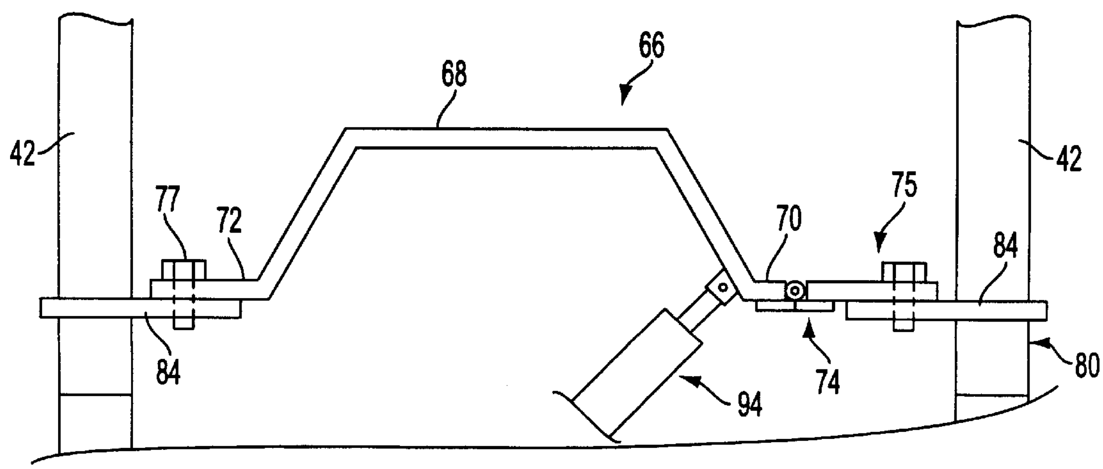
FIG. 4 is an enlarged end view of a pivoting floor structure of the cab.

In the illustrated embodiment, as shown in FIG. 4, the pivoting floor structure 66 includes a raised central portion 68 and a right side flange 70 and left side flange 72. The raised central portion 68 may be configured to accommodate space requirements of undercab components and/or height requirements of the seat 58. Alternatively, or in addition, the pivoting floor structure 66 may be constructed with folds and bends so as to increase the stiffness and rigidity of the structure. In the illustrated embodiment, the pivoting floor structure 66 is pivotally mounted by means of a hinge connection 74 connecting the right side flange 70 to mounting structure 75 that is connected to the cab footing structure 84. During normal operation of the tractor, the pivoting floor structure 66 is in the down position as shown in FIGS. 1 and 4 and in phantom in FIG. 2, and the left side flange 72 is fixedly secured to the cab foot structure 84 by means of bolts 77, or similar mechanical fasteners. Under such normal operation, the floor structure 66 defines at least a portion of the floor of the cab 10.

Figure 2:
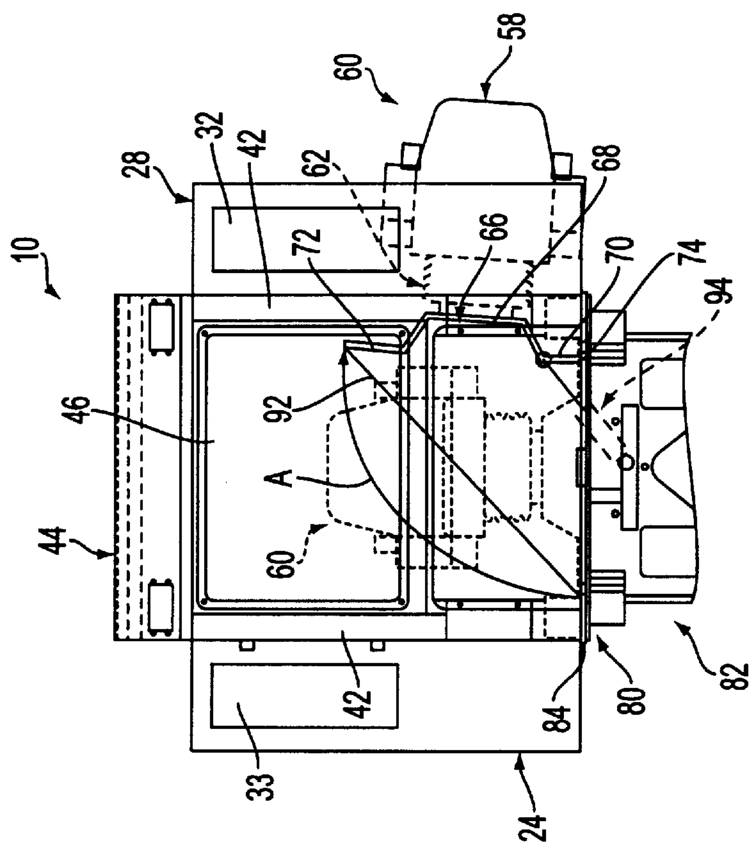
FIG. 2 is a rear elevation of the tractor cab showing the cab with the side doors open and the pivoting seat assembly pivoted sideways.

To permit access to the under-cab components, such as the transmission 88, the hydraulic cylinders 86, or the U-joint/drive line component 90, the forward doors 12 and 16 are opened, and the bolts holding the rear doors 24 and 28 closed at the respective locking brackets 25, 29 are removed, so that the rear doors 24 and 28 can be opened, as shown in FIG. 3. Next, the bolts holding the floor structure 66 down are removed, so that the pivoting floor structure 66 and the seat 58 of the pivoting seat assembly 60 can pivot outwardly in the direction of arrow "A" as shown in FIG. 2.

Although the pivoting seat assembly 60 can be actuated manually to pivot the seat 58 and floor structure 66 outwardly, it is preferred that a pivot assist mechanism, such as one or more gas spring cylinders 94, be provided to assist in pivoting the seat assembly 60. Alternatively, powered hydraulic or pneumatic cylinder systems can be employed, but such systems are not preferred because of the danger of inadvertent activation of the pivoting system. It is preferred that gas spring cylinders of sufficient size and lifting capacity be chosen, depending on the size and weight of the pivoting seat assembly 60, so that when the bolts securing the left side flange 72 to the cab footing structure 84 are removed, the pivoting seat assembly 60 will slowly begin to rise. In this manner, to achieve the full pivot position, would only require a partial measure of manual assistance.

Cylinders 94 also partially support the weight of the pivoting seat assembly 60 when it is tilted back down to the cab footing structure 84 to prevent the assembly 60 from slamming into the cab footing structure 84. In addition to bolts or other mechanical fasteners securing the left side flange 72 to the cab footing structure 84, a safety latch (not shown) can be provided as a secondary means of holding the pivoting floor structure 66 down after the mechanical fasteners are removed. Such mechanical fasteners prevent the seat assembly 60 from "popping up" or avoid inadvertent pivoting and allow for the pivoting floor structure 66 to be held down when the bolts are being reinstalled to hold flange 72 to the cab footing structure 84.

The pivoting seat assembly 60 is preferably pivoted so that the right and left flanges 70, 72 of the pivoting floor structure 66 are at least about 960 with respect to the cab footing structure 84 and frame 80, so as to provide maximum access to the under-cab components. By rotating the pivoting seat assembly at least 900, the center of gravity of the assembly 60 will be over center, so that the assembly 60 will stay in the tilted position. A strap 92 or other hard stop structure can be provided to hold the pivoting seat assembly 60 in the outwardly pivoted position and to prevent over-rotation of the seat assembly 60.

To accommodate the pivoting of a seat 58, one or more control devices 64 with sufficient control line lengths should be provided.

With the doors open and the pivoting seat assembly 60 pivoted outwardly, convenient and ample access is provided to the under-cab components for both maintenance personnel and maintenance equipment. For example, a boom hoist (not shown) can be brought into the cab 10 beneath the roof structure 44 for lifting heavy undercab components (e.g., the transmission) out of the frame of the tractor for remote servicing.

Because the whole cab is not tilted, the structural integrity of the cab-frame connection as well as the stability of the tractor is maintained. The structure is robust and can be certified in accordance with SAE guidelines as a ROPS (Roll-Over Protective Structure), FOPS (Falling Object Protective Structure) and/or OPS (Operator Protective Structure). In addition, if one or more doors becomes damaged and inoperative, under-cab access according to the present invention can be regained by simply replacing or repairing the affected door(s).

Thus, the embodiments presented herein provide a novel work vehicle cab compartment that is configured to provide safe, convenient, and ample access to under-cab components.

While the invention has been described in connection with what is presently considered to be the most practical and preferred embodiment, it is to be understood that the invention is not to be limited to the disclosed embodiments. On the contrary, modifications, variations, and equivalent arrangements are possible consistent with the above teachings or may be acquired from practice of the invention. As such, the scope of the invention is defined by the claims and their equivalents.

In this regard, while the cab compartment of the present invention has been described in accordance with a tractor vehicle, artisans of ordinary skill will readily appreciate that such a compartment may be applied with equal advantage to similar work vehicles.

Moreover, although the preferred embodiment teaches the cab compartment as configured with two doors on each side of the cab, one larger door may be provided on each side. Alternatively, the cab may include a single large door on one side and two doors on the other side of the cab.

Furthermore, while the pivoting floor structure 66 has been shown and described as a single pivoting structure, it may comprise more than one pivoting structure. For example, two opposed pivoting panels, one supporting the seat, may be installed so as to pivot in opposite directions to provide an access opening to the under-cab components.

What is claimed:

1. A cab compartment fixedly mounted onto a work vehicle frame comprising:

a cab footing structure secured to said work vehicle frame; and a pivoting floor structure having a raised central portion and flange portions, which at least partially define a floor of said cab compartment, said pivoting floor structure having one of said flange portions mechanically fastened to said cab footing structure and having another of said flange portions hingedly coupled to a mounting structure secured to said cab footing structure, wherein said pivoting floor structure is pivotally moveable in an outwardly direction to expose, and provide access to, vehicle components disposed under said cab compartment while said cab compartment remains fixedly mounted to said work vehicle frame.

2. The cab compartment of claim 1, further including, a plurality of support posts connected to said cab footing structure, said support posts extending upwardly to frame said cab compartment, a plurality of doors pivotally mounted to said support posts, and a roof structure extending across and supported atop of said posts.

3. The cab compartment of claim 2, further including, a pivoting seat assembly including an operator's seat attached atop a seat suspension, said seat suspension mounted to said pivoting floor structure, wherein said pivoting seat assembly moves in cooperation with said pivoting floor structure, when said pivoting floor structure is pivotally moved in an outwardly direction.

4. The cab compartment of claim 3, wherein said doors are configured to provide sufficient space to accommodate the passage of said pivoting seat assembly, when said pivoting floor structure is pivotally moved in an outwardly direction.

5. The cab compartment of claim 4, wherein said pivoting floor structure and said pivoting seat assembly are actuated to pivotally move in an outwardly direction by releasing said one of said flange portions mechanically fastened to the cab footing structure and pulling said pivoting seat assembly in a direction defined by said hinged coupling of one of said flange portions to said cab footing structure.

6. The cab compartment of claim 5, wherein said pivoting seat assembly is configured to allow said flange portions of pivoting floor structure to achieve at least a 90° angle relative to said cab footing structure, when said pivoting floor structure and said pivoting seat assembly are moved in an outwardly direction.

7. The cab compartment of claim 6, further including, a pivot assist mechanism, coupled to said pivoting floor structure, to assist in actuating the pivotal movement of said pivoting floor structure and said pivoting seat assembly in an outwardly direction.

8. The cab compartment of claim 7, wherein said pivot assist mechanism comprises at least one gas spring cylinder.

9. The cab compartment of claim 8, wherein select ones of said doors include locking mechanisms attached to said select doors, said locking mechanisms configured to cooperatively engage with at least one of said support posts, said roof structure, and said cab footing structure to maintain said select doors locked.

10. The cab compartment of claim 9, wherein select ones of said doors include latches, operable from inside or outside said cab compartment, to provide ingress and egress.

11. The cab compartment of claim 10, farther including a plurality of see-through panels configured to provide visibility and escape egress during emergency situations.

12. The cab compartment of claim 11, further including at least one of an instrument panel, operator pedals, a steering mechanism, and a joy stick for controlling and operating said work vehicle or attachments of said work vehicle.

13. A work vehicle comprising:

cab compartment fixedly mounted onto said work vehicle frame;

a cab footing structure secured to said work vehicle frame; and a pivoting floor structure having a raised central portion and flange portions, which at least partially define a floor of said cab compartment, said pivoting floor structure having one of said flange portions mechanically fastened to said cab footing structure and having another of said flange portions hingedly coupled to a mounting structure secured to said cab footing structure, wherein said pivoting floor structure is pivotally moveable in an outwardly direction to expose, and provide access to, vehicle components disposed under said cab compartment while said cab compartment remains fixedly mounted to said work vehicle frame.

14. The work vehicle of claim 13, further including, a plurality of support posts connected to said cab footing structure, said support posts extending upwardly to frame said cab compartment, a plurality of doors pivotally mounted to said support posts, and a roof structure extending across and supported atop of said posts.

15. The work vehicle of claim 14, further including, a pivoting seat assembly including an operator's seat attached atop a seat suspension, said seat suspension mounted to said pivoting floor structure, wherein said pivoting seat assembly moves in cooperation with said pivoting floor structure, when said pivoting floor structure is pivotally moved in an outwardly direction.

16. The work vehicle of claim 15, wherein said doors are configured to provide sufficient space to accommodate the passage of said pivoting seat assembly, when said pivoting floor structure is pivotally moved in an outwardly direction.

17. The work vehicle of claim 16, wherein said pivoting floor structure and said pivoting seat assembly are actuated to pivotally move in an outwardly direction by releasing said one of said flange portions mechanically fastened to the cab footing structure and pulling said pivoting seat assembly in a direction defined by said hinged coupling of one of said flange portions to said cab footing structure.

18. The work vehicle of claim 17, wherein said pivoting seat assembly is configured to allow said flange portions of pivoting floor structure to achieve at least a 90° angle relative to said cab footing structure, when said pivoting floor structure and said pivoting seat assembly are moved in an outwardly direction.

19. The work vehicle of claim 18, farther including, a pivot assist mechanism, coupled to said pivoting floor structure, to assist in actuating the pivotal movement of said pivoting floor structure and said pivoting seat assembly in an outwardly direction.

20. The work vehicle of claim 19, wherein said pivot assist mechanism comprises at least one gas spring cylinder.

21. The work vehicle of claim 20, wherein select ones of said doors include locking mechanisms attached to said select doors, said locking mechanisms are configured to cooperatively engage with at least one of said support posts, said roof structure, and said cab footing structure to maintain said select doors locked.

22. The work vehicle of claim 21, wherein select ones of said doors include latches, operable from inside or outside said cab compartment, to provide ingress and egress.

23. The work vehicle of claim 22, further including a plurality of see-through panels configured to provide visibility and escape egress during emergency situations.

24. The work vehicle of claim 23, further including at least one of an instrument panel, operator pedals, a steering mechanism, and a joy stick for controlling and operating said work vehicle or attachments of said work vehicle.

25. A tractor cab compartment comprising:

a cab footing structure secured to a frame of said tractor;

a pivoting floor structure having a raised central portion and flange portions, which at least partially define a floor of said cab compartment, said pivoting floor structure having one of said flange portions mechanically fastened to said cab footing structure and having another of said flange portions hingedly coupled to a mounting structure secured to said cab footing structure; and a pivoting seat assembly including an operator's seat attached atop a seat suspension, said seat suspension mounted to said pivoting floor structure, wherein said pivoting floor structure and pivoting seat assembly are pivotally moveable in an outwardly direction to expose, and provide access to, vehicle components disposed under said cab compartment while said cab compartment remains fixedly mounted to said tractor frame.

26. The cab compartment of claim 25, further including, a plurality of support posts connected to said cab footing structure, said support posts extending upwardly to frame said cab compartment, a plurality of doors pivotally mounted to said support posts, and a roof structure extending across and supported atop of said posts.

27. The cab compartment of claim 26, wherein said doors are configured to provide sufficient space to accommodate the passage of said pivoting seat assembly, when said pivoting floor structure is pivotally moved in an outwardly direction.

28. The cab compartment of claim 27, wherein select ones of said doors include locking mechanisms attached to said select doors, said locking mechanisms are configured to cooperatively engage with at least one of said support posts, said roof structure, and said cab footing structure to maintain said select doors locked.

29. The cab compartment of claim 28, wherein select ones of said doors include latches, operable from inside or outside said cab compartment, to provide ingress and egress.

30. The cab compartment of claim 29, further including a plurality of see-through panels configured to provide visibility and escape egress during emergency situations.

31. The cab compartment of claim 30, further including at least one of an instrument panel, operator pedals, a steering mechanism, and a joy stick for controlling and operating said work vehicle or attachments of said work vehicle.

32. The cab compartment of claim 25, wherein said pivoting floor structure and said pivoting seat assembly are actuated to pivotally move in an outwardly direction by releasing said one of said flange portions mechanically fastened to the cab footing structure and pulling said pivoting seat assembly in a direction defined by said hinged coupling of one of said flange portions to said cab footing structure.

33. The cab compartment of claim 32, wherein said pivoting seat assembly is configured to allow said flange portions of pivoting floor structure to achieve at least a 90° angle relative to said cab footing structure, when said pivoting floor structure and said pivoting seat assembly are moved in an outwardly direction.

34. The cab compartment of claim 33, further including, a pivot assist mechanism, coupled to said pivoting floor structure, to assist in actuating the pivotal movement of said pivoting floor structure and said pivoting seat assembly in an outwardly direction.

35. The cab compartment of claim 34, wherein said pivot assist mechanism comprises at least one gas spring cylinder.

* * * * *